Feb. 21, 1933.                G. F. HARDING                1,898,365
                DRINK MIXER WITH ULTRA VIOLET RAY ATTACHMENTS
                     Filed March 2, 1931        2 Sheets-Sheet 2
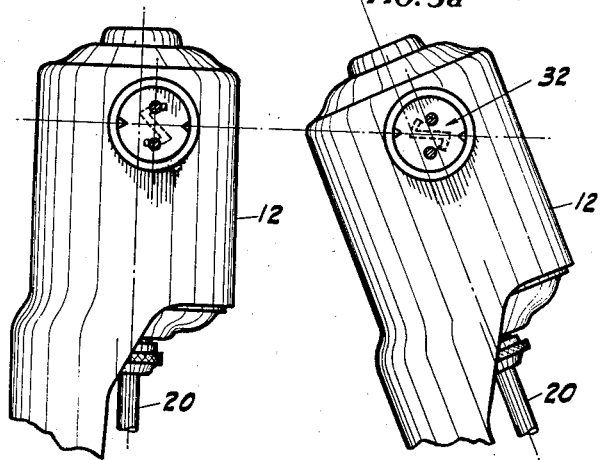
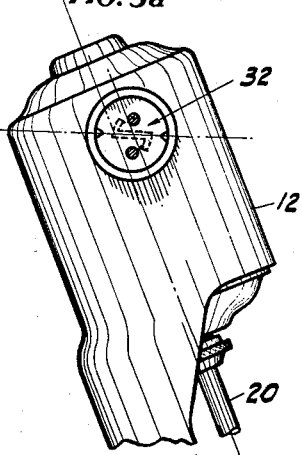
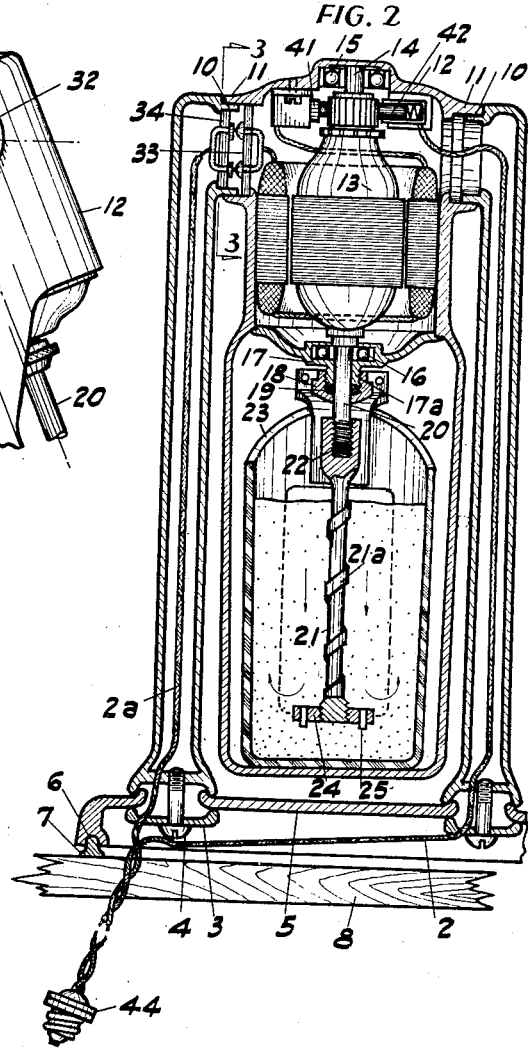
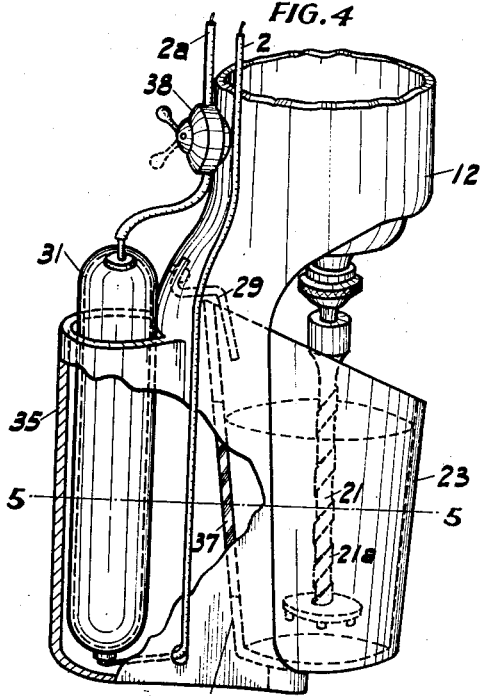
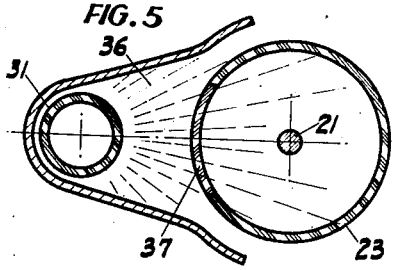
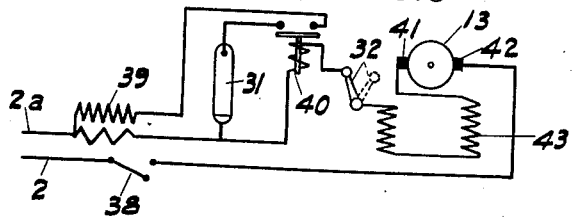
INVENTOR
*GLEN FOSTNER HARDING*
BY
ATTORNEY Patented Feb. 21, 1933

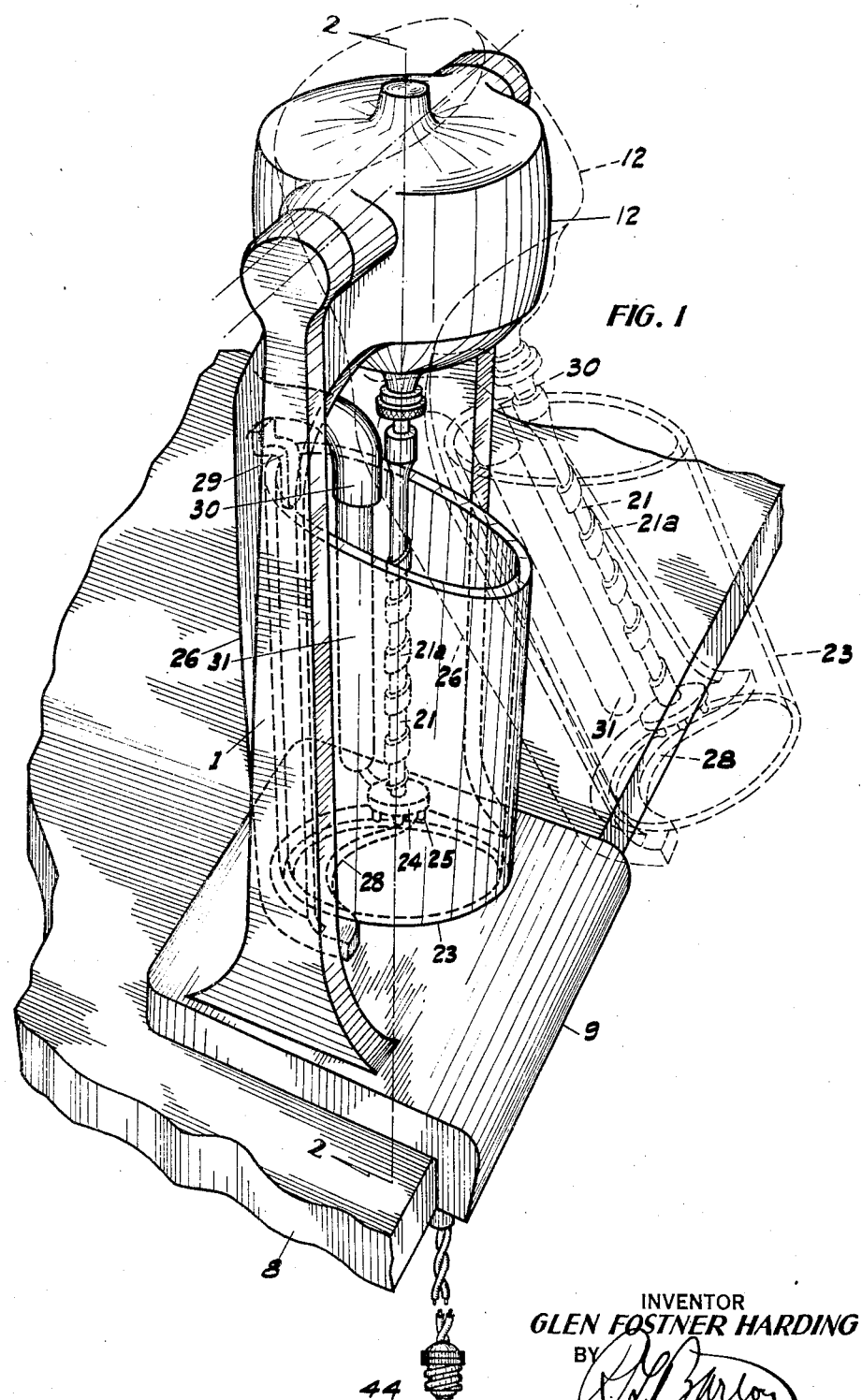

1,898,365

UNITED STATES PATENT OFFICE

GLEN FOSTNER HARDING, OF OGDEN, UTAH

DRINK MIXER WITH ULTRA-VIOLET RAY ATTACHMENTS

Application filed March 2, 1931. Serial No. 519,434.

My invention relates to improved drink mixers for mixing liquids and solids for use particularly where soft drinks such as malted milk and the like are dispensed, it being necessary at times to serve a drink, the ingredients of which are made up of a group of parts, which must be thoroughly mixed before serving, and the invention has for one of its objects the provision of an ultra-violet-ray attachment for the production of ultra-violet-rays, which rays will, by virtue of arrangement and proximity to various mixtures of ice cream, milk, cream, malted milk, fruit or other flavors; water, carbonated water or any beverage; or solid, liquid; or semi-solid or semi-liquid substance, give the various substances or groups of substances, the health value derived from the ultra-violet-rays, thereby creating, producing, and adding in a more expeditious manner the health necessity known as Vitamin D, together with other products of worth to the human body growth and regulation.

A further object of my invention is in the method and means of starting the device, there being the provision of an eccentrically poised electric motor, the starting and stopping of which is automatically operated.

A further object of my invention is the incorporation of a switch automatic actuable by the eccentricity mounting of the mixer, the disks of said switch providing a non-metallic bearing between the housing and the pillar in which the switch is housed.

A further object of my invention is the incorporation of a new type of mixing or agitator rod, whereby the contents of the drink will be more efficiently agitated and mixed.

A still further object of my invention will be found in a study of the very compact and sturdy construction involving beauty and symmetry which embody simplicity and efficiency in operation.

Other objects may hereinafter appear from the description following, attention now being directed to the accompanying drawings forming therein a part and in which:—

Fig. 1 is a perspective view of the mixer with the ultra-violet-ray attachment shown in full lines in operative position and in dotted lines in inoperative position, the ultra-violet-ray tube being adapted to share part of the space within the drink mixing receptacle.

Fig. 2 is a section taken in the direction of the arrows on line 2—2 of Fig. 1.

Fig. 3 is a fragmentary portion of the device showing the eccentricity of the motor housing and the switch closed, the position being that of the operative one.

Fig. 3—a is a fragmentary portion of that part shown in Fig. 3, however in the latter view the switch is open and the position of the device is that of the inoperative one.

Fig. 4 is a fragmentary part sectional side elevated showing the position of the ultra-violet-ray tube moved to a position without the drinking mixing receptacle, the ultra-violet-rays in the latter view being adapted to be directed through a quartz window formed integral with the receptacle.

Fig. 5 is a section taken on line 5—5 of Fig. 4; and,

Fig. 6 is a proposed wiring diagram.

In the drawings, I show a pair of pedestals 1, which are preferably constructed hollow for the purpose of concealing electric wires 2 and 2a, fastened by means of a spring steel plate 3 and screws 4 to a base 5.

There is inserted in a groove 6 in the bottom side edge of the base 5 a rubber dampener 7, which absorbs any noticeable vibration and also prevents damage from rubbing to the counter 8 on which the device sits.

The base 5 is constructed with a hollow interior adapted for housing of the electric wiring, and it is provided with an overlapping flange 9 which abuts against the edge of the counter 8. Said flange in addition to stabilizing the device presents a pleasing appearance to the eye by balancing the base design.

The pedestals 1 have their top-most extremity formed into a circularly flanged trunnion bearing seat 10, upon which a similarly constructed flanged trunnion 11 of the motor housing 12 telescopically gyrates and is eccentrically poised.

Encased within the housing 12 is the electric motor 13 of any preferred type or make, having a vertically extending shaft 14 mounted to rotate in ball bearings 15 and 16. The ball bearing 16 also forms a thrust bearing on which the motor 13 is mounted and said ball thrust bearing 16 is seated within a flanged recess 17 of the motor housing 12.

The flanged recess 17 is elongated to form a nipple 17a whereby to form a threaded extension to which is applied a packing nut 18 containing a packing gland 19 for the purpose of restraining any lubricant from seeping down on the surface of the shaft extension 20 onto the mixing rod 21 and eventually into the substance being mixed.

The threaded extremity 22 of the shaft extension 20 is adapted to be screwed into the end of the mixing rod 21 so that the axis of the rod coincides with that of the motor.

The mixing or agitator rod 21 is milled with a screw like form of thin extremes which is adapted to force down the liquid in the cup 23 near the center and up at the sides whereby the lesser heavy liquid of the top is agitated and mixed with the heavier bodies which gravitate toward the bottom.

There is secured or otherwise fastened to the lower end of the mixing rod 21 an agitator disk 24, the radial extent of which is greater than that of the threads 21a of the rod 21. In the bottom of said disk are formed near its periphery, three rod projections 25. The latter feature will cut up ice cream and semi-solids on downward draw of the liquid due to the screw design.

The motor housing 12 is inclined outwardly and downwardly on its back side to form a shell receptacle 26 on which is adapted to rest the cup 23 in which the liquid is mixed.

There is provided a crescent shaped flange 28 on which the cup 23 rests, and there is a clip 29 fastened to the back side of the shell 26 which overlies an edge portion of the cup, whereby the cup is secured to its seat.

Projecting inwardly from the inner side of the shell 26 and then directed downwardly is a bracket 30 for supporting the ultra-violet-ray tube 31. The latter construction is shown in Fig. 1 and the mixing cup in this view contains both the agitator rod and tube.

The cup 23 is designed somewhat taller in proportion to its diameter average, and its top edge is tapered to approximately a 60 degree angle so that the contents will not spill while being loaded at an angle in the mixer or while it is swung from inoperative to operative position and vice versa.

By virtue of the cup's tapered top the clip will always be above the liquid level line. In Fig. 1 the dotted portion is that of the inoperative one. In the latter position the agitator rod is automatically stopped, since by referring to Fig. 3a it will be seen that in that position the switch 32 is open. To assume the latter position it is to be understood the operator has lifted the cup off its seat after which the eccentricity of the motor housing causes the agitator and cup seat to move outwardly through approximately an angle of from 30 to 40 degrees, during which time the switch is disrupted.

When the cup is tilted and its upper edge is directed underneath the clip and then allowed to gravitate to rest on the crescent shaped flange, the weight of the cup and contents over-rides that of the eccentricity and the agitator rod assumes a position of plumb. By reference to Fig. 3 it will be seen that in this position the switch is closed automatically by the weight of the contents of the cup as aforesaid.

It will therefore be obvious that the switch will only remain closed so long as the contents are being mixed, and that the opening and closing of it is automatic.

The rod therefore need not be stopped by hand to prevent it from splashing the contents, as in the case of sudden releasing in the non-tilting type. In my improved mixer the motor automatically stops while the angle of tilt is being made larger with the mixing rod still in the cup.

This method also is more sanitary since the operation of mixing drinks at rush hours of the day are usually continuous and operators do not take the time to properly sterilize the stems after each time handling them.

The switch 32 is composed of two bakelite discs 33 and 34. The disc 33 is rotative with the motor housing and assembled in its trunnion. The disc 34 is stationary and juxtaposed within the pedestal bearing trunnion. The poles of these two discs register "on" and "off" as the housing automatically assumes its operative and inoperative positions. They also provide a non-metallic bearing between the pedestals and motor, in addition to supplying the current break. Only one switch is shown in the present instance to simplify construction.

In Fig. 4 the ultra-violet-ray tube is shown without the cup. In the latter view the shell receptacle 26 has its back side extended to form a pocket 35 into which the tube is housed.

The ultra-violet-rays 36 from the tube, are directed into the contents of the cup through the quartz window 37, integralized in the cup. Fig. 5 clearly indicates the manner in which the rays may be made to penetrate into the cup and vitamize the contents thereof.

In Fig. 6 is shown a proposed wiring diagram constructed from the conventional symbols analytic of those comprising the device.

The diagram comprises the positive and negative leads 2 and 2a. In one of these lines, i. e., 2, is placed a safety switch 38 which may be closed at all times, the voltage being automatically governable to operate the motor by the transformer 39 and relay 40, automatically operated by the rotary switch 32. The well known brushes 41 and 42, together with the field coils 43, complete the diagram with the exception of the ultra-violet-ray tube which is designated by its numeral 31. The wires 2 and 2a are connectable to a plug 44, the outlet for which is suitably provided for in conjunction with stands where devices such as this described are made use of.

The operation of performing the loading will now be discussed.

Normally the device assumes the dotted angle of poise, due to the eccentricity of design as shown in Fig. 1.

In loading the previously filled cup 23 the operator slips the cup upwardly so that the stirring rod 21 and tube 31 are fed into the cup, the back edge of the cup being slipped behind the clip 29 and the cup then allowed to gravitate to rest on the crescent shaped cup rest or flange 28.

On removing the hand, the filled cup overcomes the eccentricity of the housing and the rotative parts of the device assume a position of plumb. While the parts are traversing the angular path of tilt, the rotary switch has its terminals closed whereby the agitator rod is already rotating when the amplitudinal swing is completed. Simultaneously the ultra-violet-rays are generated and vitamize the liquid contents as they are being agitated.

At the option of the operator he grasps the cup, the device automatically starting tilting and thereby automatically disrupting the switch as he slips the lip of the cup from under the clip gradually tilting the cup so the bottom edge may clear the crescent shaped support whence the cup is free to have the drink served.

I claim:

1. In a drink mixer, a base, supporting means upstanding from said base, a housing trunnionally supported by said means, a drink mixing receptacle support attached to and depending from said housing to swing to and from an inclination at one side of the vertical, a motor carried by said housing, said receptacle support being adapted to hold up a drink mixing receptacle which when filled with liquid will cause said receptacle support to gravitate from a normally inclined position to a substantially vertical position, an agitator for mixing the drinks, operating means for said agitator, a violet-ray tube holder juxtapositioned therewith whereby to direct the rays from a violet-ray tube contained therein to treat the contents of said receptacle, conductors to supply electric current to said motor and said violet-ray tube, a normally open electric switch for said conductors, and means whereby the movement from the inclined position to the vertical position closes said switch and thereby simultaneously energizes the tube and operates said agitator.

2. In a device of the class described the combination with a tiltable cup support and means for swingingly mounting said cup support, of a drink mixing cup having a top edge which is inclined with relation to the body of the cup thereby increasing the length of the back side of the cup, whereby the contents of the cup will be on a level with said edge when said support is in inclined position with said cup resting thereon, a window in the back side of said cup and a violet-ray tube positioned upon said support for emitting ultra-violet-rays through said window, said cup being adapted to be gravitationally swung to mixing position without spilling the contents of said cup.

3. In a device of the class described, a base, supporting means upstanding from said base and provided at a distance thereabove with two bearings in opposed spaced relation to each other, a housing provided with oppositely disposed trunnions which cooperate with said bearings to pivotally support said housing eccentrically with respect to its center of gravity, a drink mixing receptacle support depending from said housing to swing together therewith to and from an inclination at one side the vertical, a motor carried by said housing, a source of electric current to operate said motor, a stirring device operatively connected with said motor, said receptacle support being adapted to sustain a cup in a position to have its contents agitated by said stirrer, a switch including a rotary switch disk to control the current through said conductors, and means whereby swinging of said housing from an inclined to a more nearly upright position rotates said switch disk to actuate said motor.

4. A drink mixing and vitamizing device comprising a base, a pair of pedestals mounted on said base, oppositely disposed trunnion bearings formed at the pinnacle of said pedestals, a motor housing eccentrically poised thereupon to assume a tilting position in inoperative position and provided with trunnions rotative telescopically on said trunnion bearings, a motor shaft, a motor rotative on said shaft, said shaft having a threaded extension, a mixing rod secured to said extension the axis of which coincides with that of the axis of said motor, a drink mixing receptacle support atatched to and depending from said housing which is adapted to sustain a drink mixing cup into which said mixing rod is projected during the agitation of a drink, and a violet-ray tube receptacle integralized with said receptacle support.

5. A drink mixer comprising a base, a pair of pedestals mounted on said base, trunnion bearings formed on said pedestals, a motor housing eccentrically poised to assume a tilting position in inoperative position provided with trunnions rotative telescopically on said trunnion bearings, a motor shaft, a motor rotative on said shaft, said shaft having a threaded extension, a mixing rod secured to said extension the axis of which coincides with that of the axis of said motor, a drink mixing receptacle support attached to and depending from said housing which is adapted to sustain a cup into which said mixing rod is projected, and a switch including a rotary switch disk automatically actuated by the eccentric tilting of said motor housing to actuate said motor.

6. A drink mixer comprising a base, a pair of pedestals mounted on said base, trunnion bearings formed at the pinnacle of said pedestals, a motor housing eccentrically poised to assume a tilting position in inoperative position provided with trunnions rotative telescopically on said trunnion bearings, a motor shaft, a motor rotative on said shaft, said shaft having a threaded extension, a mixing rod secured to said extension, the axis of which coincides with that of the axis of said motor, a drink mixing receptacle support attached to and depending from said housing which is adapted to sustain a cup into which said mixing rod is projected, a switch including a switch disk automatically actuated by the eccentric tilting of said motor housing to actuate said motor, and a liquid container adapted to be carried by said receptacle support to cause the latter to gravitate to vertical position thereby closing said switch.

7. A drink mixer comprising supporting pedestals, a motor housing and a motor eccentrically poised on said pedestals, trunnion bearings on said pedestals on which trunnions on said motor housing tilts, and a switch including a pair of switch disks in said trunnion bearings, whereby said motor is actuated by the tilting of said housing.

8. A drink mixer comprising supporting pedestals, a motor housing and a motor eccentrically poised on said pedestals, trunnion bearings on said pedestals on which trunnions on said motor housing tilts, and a switch including a pair of switch disks; one of said disks being adapted to close and open the circuit to said motor by the swinging of said housing.

9. A drink mixer comprising a base, a pair of pedestals mounted on said base, trunnion bearings formed at the pinnacle of said pedestals, a motor housing eccentrically poised to assume a tilting position in inoperative position provided with trunnions rotative telescopically on said trunnion bearings, a motor shaft, a motor rotative on said shaft, said shaft having a mixing rod secured thereto, a drink mixing receptacle support depending from said housing which is adapted to sustain a cup into which said mixing rod is projected, a switch including a pair of switch disks automatically actuated by the eccentric tilting of said motor housing and receptacle support to control the current to said motor, and a liquid container adapted to be carried by said receptacle support to cause the latter to gravitate to a vertical position thereby rotating one of said disks to close said switch.

GLEN FOSTNER HARDING.